(12) United States Patent
Balasubramanian

(10) Patent No.: US 9,971,794 B2
(45) Date of Patent: May 15, 2018

(54) CONVERTING DATA OBJECTS FROM MULTI- TO SINGLE-SOURCE DATABASE ENVIRONMENT

(71) Applicant: Makesh Balasubramanian, Bangalore (IN)

(72) Inventor: Makesh Balasubramanian, Bangalore (IN)

(73) Assignee: SAP SE, Walldorf (DE)

( * ) Notice: Subject to any disclaimer, the term of this patent is extended or adjusted under 35 U.S.C. 154(b) by 280 days.

(21) Appl. No.: 14/326,153

(22) Filed: Jul. 8, 2014

(65) Prior Publication Data

US 2016/0012042 A1  Jan. 14, 2016

(51) Int. Cl.
*G06F 17/30* (2006.01)

(52) U.S. Cl.
CPC ...... *G06F 17/303* (2013.01); *G06F 17/30303* (2013.01); *G06F 17/30297* (2013.01); *G06F 17/30545* (2013.01); *G06F 17/30563* (2013.01); *G06F 17/30569* (2013.01); *G06F 17/30914* (2013.01)

(58) Field of Classification Search
CPC ......... G06F 17/30545; G06F 17/30914; G06F 17/30569; G06F 17/30297; G06F 17/30563; G06F 17/30433; G06F 17/3089
USPC .......................... 707/705, 706, 707, 769, 802
See application file for complete search history.

(56) References Cited

U.S. PATENT DOCUMENTS

| | | | | |
|---|---|---|---|---|
| 5,684,988 A | * | 11/1997 | Pitchaikani | ........... H04L 41/046 |
| 5,713,020 A | * | 1/1998 | Reiter | ............... G06F 17/30412 |
| 6,023,694 A | * | 2/2000 | Kouchi | ............. G06F 17/30569 707/770 |
| 6,704,726 B1 | * | 3/2004 | Amouroux | ........ G06F 17/30433 |

(Continued)

FOREIGN PATENT DOCUMENTS

WO    2000000909 A1    1/2000

OTHER PUBLICATIONS

Emily Sergent, SAP Ideal Place, "My Idea Place", Aug. 27, 2013.
(Continued)

*Primary Examiner* — Frantz Coby
(74) *Attorney, Agent, or Firm* — Fountainhead Law Group P.C.

(57) ABSTRACT

Embodiments relate to converting data object(s) from a multi-source database environment into a single-source database environment. Such a conversion may be desirable to increase performance and/or reduce consumption of processing resources. An engine is configured to receive a multi-source database universe from a repository. The engine analyzes that universe to identify details thereof for conversion, e.g., connections, tables, views, alias tables, etc. A new single-source connection is registered, and then the single-source universe is re-generated through a universe conversion algorithm, an automatic function mapping algorithm, and a query generation algorithm. Embodiments avoid labor intensive manual re-creation of the universe, and may be implemented as an automatic conversion wizard also updating dependent report queries per new single-source (Continued)

query patterns. Particular embodiments converting from multi-source database environment available from SAP AG, may utilize a Software Design Kit (SDK) to create a migration plug-in as part of an Information Design Tool (IDT).

14 Claims, 17 Drawing Sheets

(56) References Cited

U.S. PATENT DOCUMENTS

| | | | | |
|---|---|---|---|---|
| 6,704,747 | B1* | 3/2004 | Fong | G06F 17/30893 |
| 6,892,204 | B2* | 5/2005 | Haas | G06F 17/30241 |
| | | | | 701/532 |
| 6,996,589 | B1* | 2/2006 | Jayaram | G06F 17/30569 |
| 7,472,412 | B2* | 12/2008 | Wolf | H04L 41/0213 |
| | | | | 370/254 |
| 7,496,569 | B2* | 2/2009 | Theobald | G06F 17/30439 |
| 7,647,298 | B2 | 1/2010 | Adya et al. | |
| 7,761,848 | B1* | 7/2010 | Chaffin | G06F 8/20 |
| | | | | 717/106 |
| 7,849,050 | B2* | 12/2010 | Mangipudi | G06F 17/30563 |
| | | | | 707/602 |
| 7,962,920 | B2* | 6/2011 | Gabriel | G06F 8/20 |
| | | | | 708/110 |
| 8,165,990 | B2* | 4/2012 | Val | G06F 17/30297 |
| | | | | 707/609 |
| 8,275,850 | B2* | 9/2012 | Kohan | G06F 19/322 |
| | | | | 709/212 |
| 8,326,868 | B2* | 12/2012 | Kocsis | G06F 17/30893 |
| | | | | 707/771 |
| 8,443,374 | B2 | 5/2013 | Li et al. | |
| 8,447,739 | B2 | 5/2013 | Naibo et al. | |
| 8,489,669 | B2 | 7/2013 | Johnson | |
| 8,533,177 | B2 | 9/2013 | Huck et al. | |
| 8,838,547 | B2* | 9/2014 | Kocsis | G06F 17/30398 |
| | | | | 707/688 |
| 9,223,546 | B1* | 12/2015 | Chaffin | G06F 8/20 |
| 2002/0174122 | A1* | 11/2002 | Chou | G06F 17/30545 |
| 2004/0010458 | A1* | 1/2004 | Friedman | G06Q 40/00 |
| | | | | 705/35 |
| 2004/0172459 | A1* | 9/2004 | Schwalm | H04L 29/06 |
| | | | | 709/217 |
| 2004/0199516 | A1* | 10/2004 | Thames | G06F 8/71 |
| 2004/0260715 | A1 | 12/2004 | Mongeon et al. | |
| 2005/0015360 | A1 | 1/2005 | Cras et al. | |
| 2005/0144226 | A1* | 6/2005 | Purewal | G06F 8/70 |
| | | | | 709/203 |
| 2005/0209876 | A1 | 9/2005 | Kennis et al. | |
| 2005/0256742 | A1* | 11/2005 | Kohan | G06F 19/322 |
| | | | | 705/2 |
| 2005/0278368 | A1* | 12/2005 | Benedikt | G06F 17/227 |
| 2006/0241956 | A1* | 10/2006 | Levy | G06Q 10/10 |
| | | | | 703/6 |
| 2007/0027932 | A1* | 2/2007 | Thibeault | G06F 17/3089 |
| 2008/0059413 | A1 | 3/2008 | Evans et al. | |
| 2008/0071799 | A1 | 3/2008 | Evans et al. | |
| 2009/0319498 | A1* | 12/2009 | Zabokritski | G06F 17/30427 |
| 2010/0017380 | A1 | 1/2010 | Naibo et al. | |
| 2011/0035414 | A1* | 2/2011 | Barton | G06Q 30/02 |
| | | | | 707/802 |
| 2012/0331447 | A1 | 12/2012 | Nayak et al. | |
| 2013/0125053 | A1 | 5/2013 | Brunswig et al. | |
| 2013/0304799 | A1 | 11/2013 | Lutter et al. | |
| 2013/0339311 | A1 | 12/2013 | Ferrari et al. | |
| 2014/0095550 | A1 | 4/2014 | Rantanen | G06F 17/303 |
| | | | | 707/809 |
| 2014/0250040 | A1* | 9/2014 | Kieselbach | G06N 5/02 |
| | | | | 706/46 |
| 2015/0154240 | A1* | 6/2015 | Vezzosi | G06Q 10/06 |
| | | | | 707/803 |

OTHER PUBLICATIONS

Internet article Conversion of the relational universes in BI4.x, from UNV to UNX, (added by Sinisa Knezevic last edited by Sinisa Knezevic on Apr. 8, 2011.

* cited by examiner

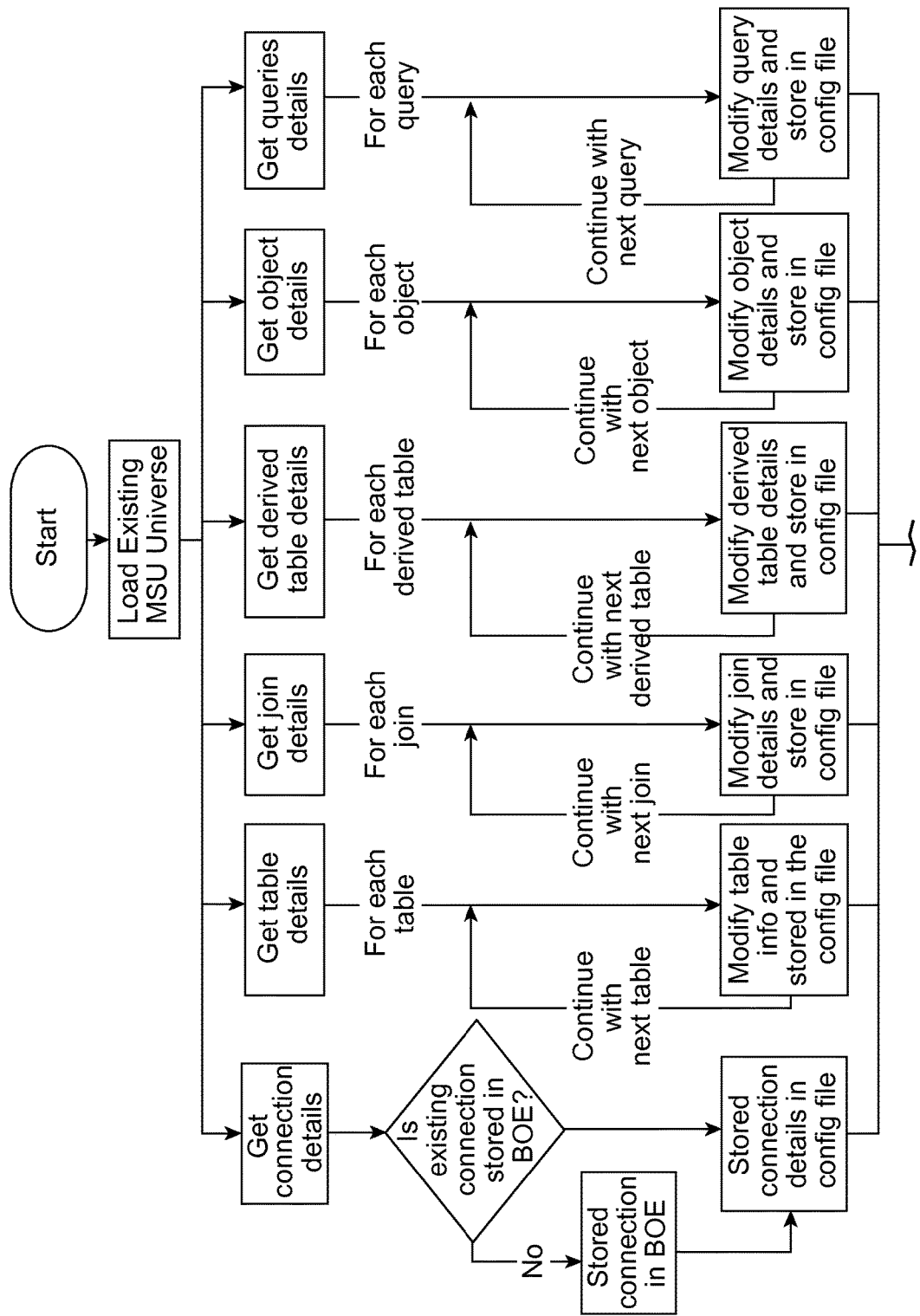
FIG. 1D1

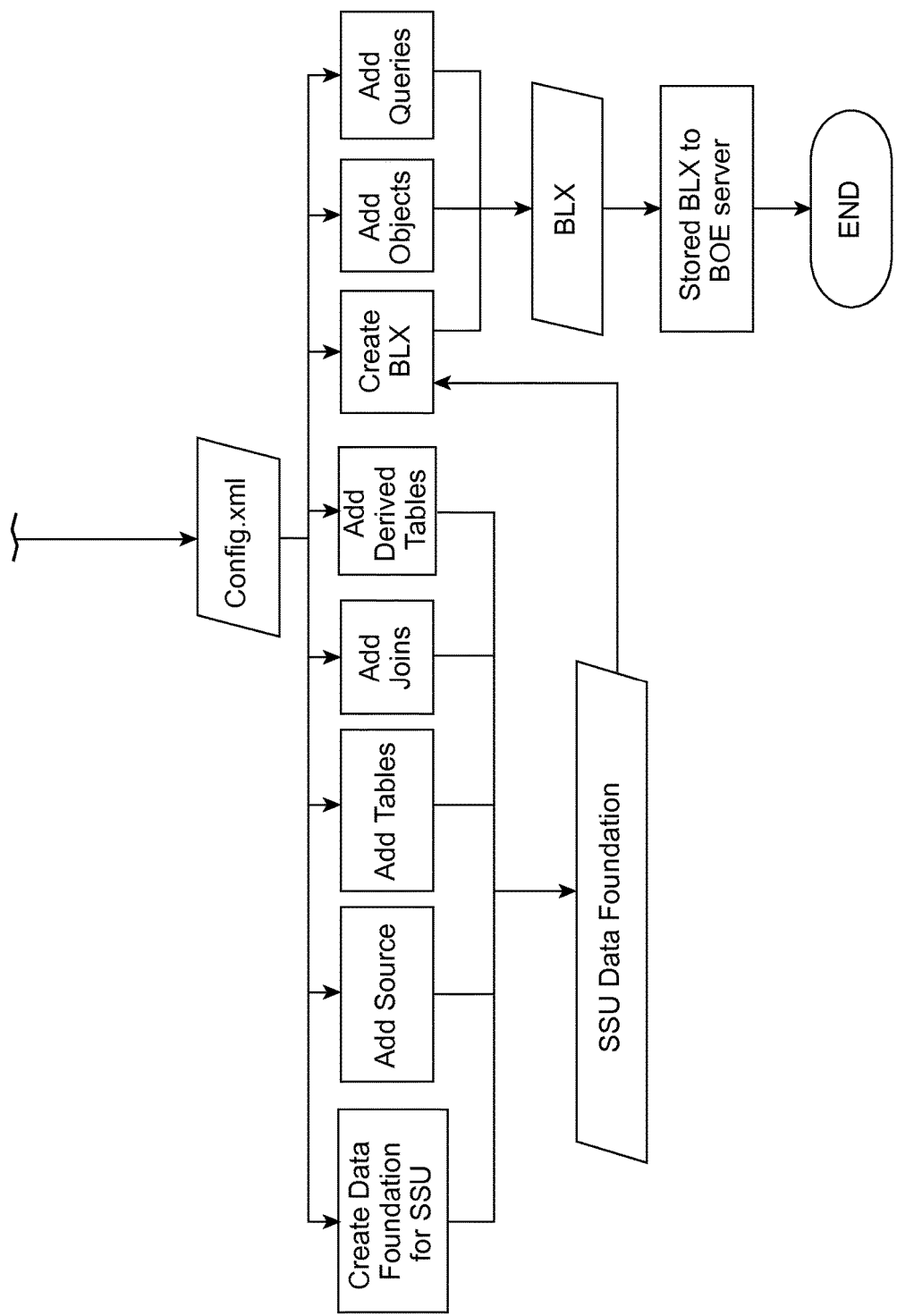
FIG. 1D2

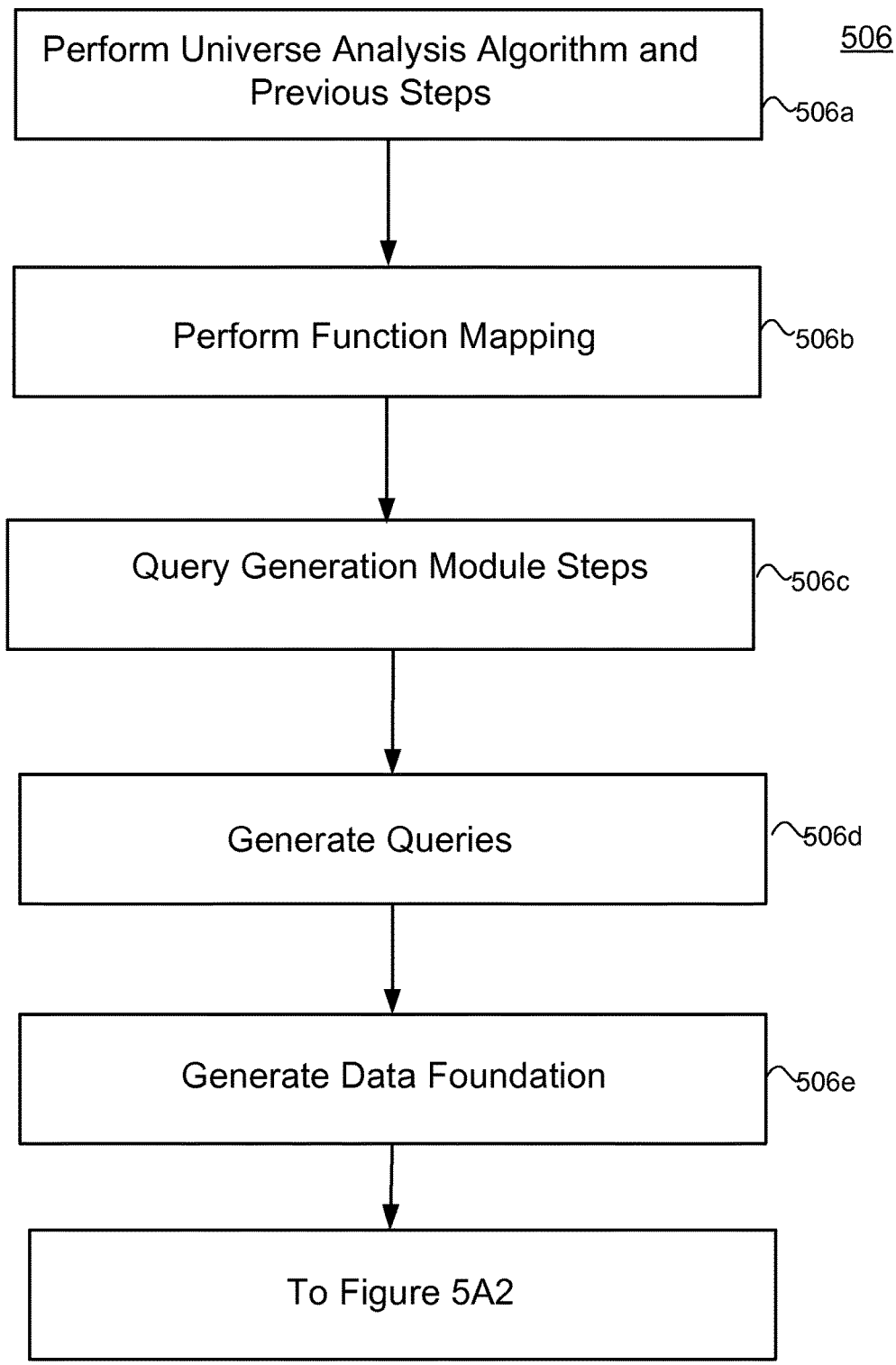
FIG. 5A1

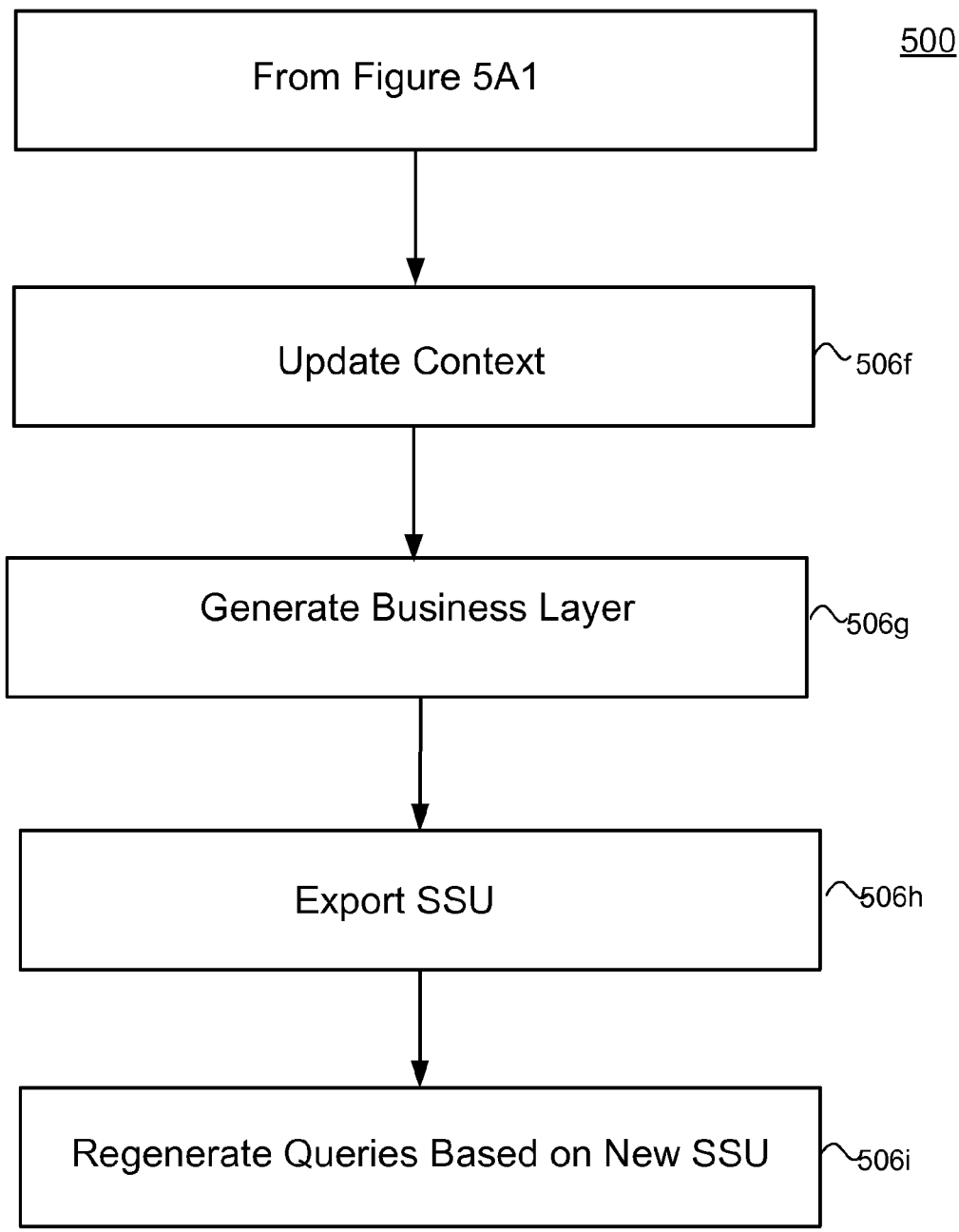
FIG. 5A2

CONVERTING DATA OBJECTS FROM MULTI- TO SINGLE-SOURCE DATABASE ENVIRONMENT

BACKGROUND

Embodiments of the present invention relate to data objects of a database, and in particular to converting data objects from a multi-source to a single-source database environment. Unless otherwise indicated herein, the approaches described in this section are not prior art to the claims in this application and are not admitted to be prior art by inclusion in this section.

Currently, enterprises tend to rely upon databases and data objects originating from a single, global platform. Increasingly, however, enterprises may be faced with storing and accessing data and data objects from across a plurality of different database platforms.

In one example such a situation may arise in a merger/acquisition between different companies. In this type of a scenario, data of the target company needs to be available to the acquiring company moving forward. That target data, however, may be formatted as a data object according to a database platform that is different from the acquiror's. The conditions described above may call for rapidly and automatically combining data from data objects of different formats, to update existing reports with new data.

Under certain circumstances, however, it may be desired to utilize database data from a single-source database universe. For example, a single-source database universe may exhibit improved performance (e.g., speed) and consume fewer processing resources than a multi-source universe. For these and other (e.g., legacy, archive) purposes, it may be useful to convert data from a multi-source universe into a single-source universe. Such conversion, however, is a labor-intensive process.

SUMMARY

Embodiments relate to converting data object(s) from a multi-source database universe (MSU) environment into a single-source database universe (SSU). Such a conversion may be desirable in order to increase performance and/or reduce consumption of processing resources. An engine is configured to receive a multi-source database universe from a repository. With reference to a configuration file (e.g., an XML file from a data federator), the engine analyzes that universe to identify details thereof for conversion, e.g., connections, tables, views, alias tables, etc. A new single-source connection is registered, and then the single-source universe is re-generated through a universe conversion algorithm, an automatic function mapping algorithm, and a query generation algorithm. Embodiments avoid labor intensive manual re-creation of the single source universe, and may be implemented as an automatic conversion wizard also updating dependent report queries per new single-source query patterns. Particular embodiments converting from multi-source database environment available from SAP AG, may utilize a Software Design Kit (SDK) to create a migration plug-in as part of an Information Design Tool (IDT).

An embodiment of a computer-implemented method comprises causing an engine to receive a multi-source universe database comprising a plurality of details, causing the engine to analyze the multi-source universe database referencing a configuration file in order to identify a detail to be changed, and causing the engine to register a new single-source connection with a repository. The engine is caused to reference the configuration file to create a single-source universe database including the single-source connection and a changed detail.

A non-transitory computer readable storage medium embodies a computer program for performing a method comprising causing an engine to receive a multi-source universe database comprising a plurality of details, causing the engine to analyze the multi-source universe database referencing a configuration file in order to identify a detail to be changed, the multi-source universe analyzed to identify a data object by a database function, and causing the engine to register a new single-source connection with a repository. The method further comprises causing the engine to reference the configuration file to create a single-source universe database including the single-source connection and a changed detail, the single-source universe database comprising a native function corresponding to the database function.

An embodiment of a computer system comprises one or more processors and a software program executable on said computer system and configured to cause an engine to receive a multi-source universe database comprising a plurality of details. The software program is further configured to cause the engine to analyze the multi-source universe database referencing a configuration file from a data federator in order to identify a detail to be changed, the multi-source universe analyzed to identify a data object by a database function. The software program is further configured to cause the engine to register a new single-source connection with a repository. The software program is further configured to cause the engine to reference the configuration file to create a single-source universe database including the single-source connection and a changed detail, the single-source universe database comprising a native function corresponding to the database function.

In certain embodiments the multi-source universe database is analyzed to identify a data object by a database function, and the single-source universe database comprises a corresponding native function.

According to some embodiments, creating the single-source universe database further comprises re-generating a business layer including a new object definition compatible with the single-source universe database.

In particular embodiments creating the single-source universe further comprises generating a query.

In various embodiments a connection of the multi-source universe database is analyzed to identify vendor and version information.

According to some embodiments the configuration file is from a data federator.

In certain embodiments the configuration file comprises an XML file.

According to some embodiments creating the single-source universe database further comprises re-generating a data foundation from a software development kit available from a vendor of the single-source universe database.

The following detailed description and accompanying drawings provide a better understanding of the nature and advantages of particular embodiments.

BRIEF DESCRIPTION OF THE DRAWINGS

FIGS. 1D1-1D2 are additional flow diagrams illustrating an embodiment of a method.

FIGS. 2-2D show steps of universe analysis according to an embodiment.

FIGS. 5-5A2 show steps of universe conversion according to an embodiment.

DETAILED DESCRIPTION

Described herein are techniques converting data objects from a multi-source database environment to a single-source database environment. As used herein, the term "universe" also refers to the database environment. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments relate to converting data object(s) from a multi-source database environment into a single-source database environment. An engine is configured to receive a multi-source database universe from a repository. The engine analyzes that universe to identify details thereof for conversion, including but not limited to connections, tables, views, alias tables, etc. A new single-source connection is registered, and then the single-source universe is re-generated through a universe conversion algorithm, an automatic function mapping algorithm, and a query generation algorithm. Embodiments avoid labor intensive manual re-creation of the SSU, and may be implemented as an automatic conversion wizard also updating dependent report queries per new single-source query patterns. Particular embodiments converting from multi-source database environment available from SAP AG, may utilize a Software Design Kit (SDK) to create a migration plug-in as part of an Information Design Tool (IDT).

Figure 1:
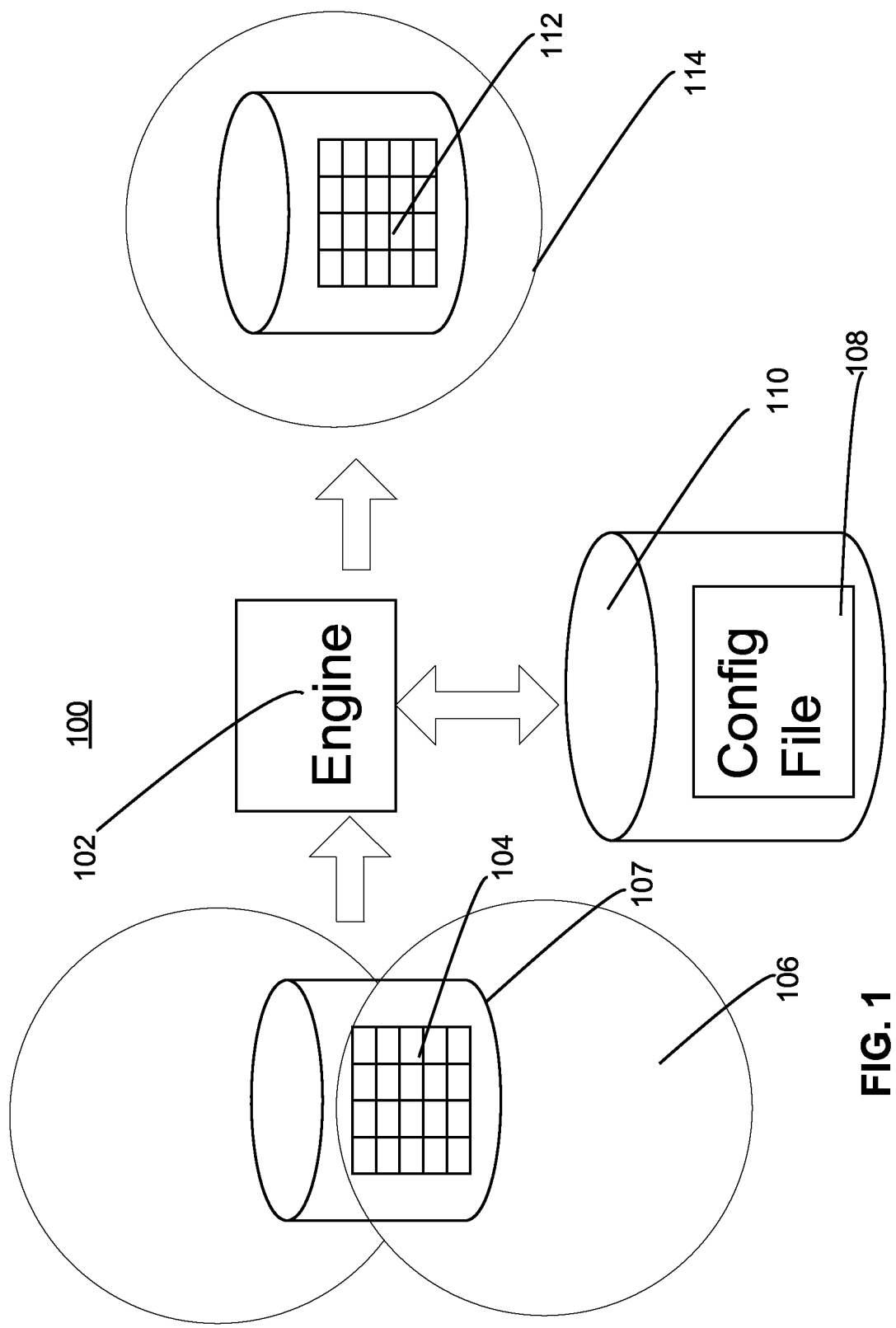
FIG. 1 shows a simplified view of a system according to an embodiment.

FIG. 1 shows a simplified view of a system according to an embodiment. In particular, system 100 comprises an engine 102 that is configured to receive as input, a database 104 within a multi-source environment or universe 106. The database 104 may be stored on a non-transitory computer readable storage medium 107.

In response to receiving this input, the engine 102 is configured to reference a configuration file 108 that is stored in a non-transitory computer-readable storage medium 110.

As described in detail below, the engine may perform processing according to one or more algorithms. Based upon this processing by the engine in conjunction with the configuration file, the engine is configured to output a database 112 that is compatible with a single-source universe 114.

Figure 1A:
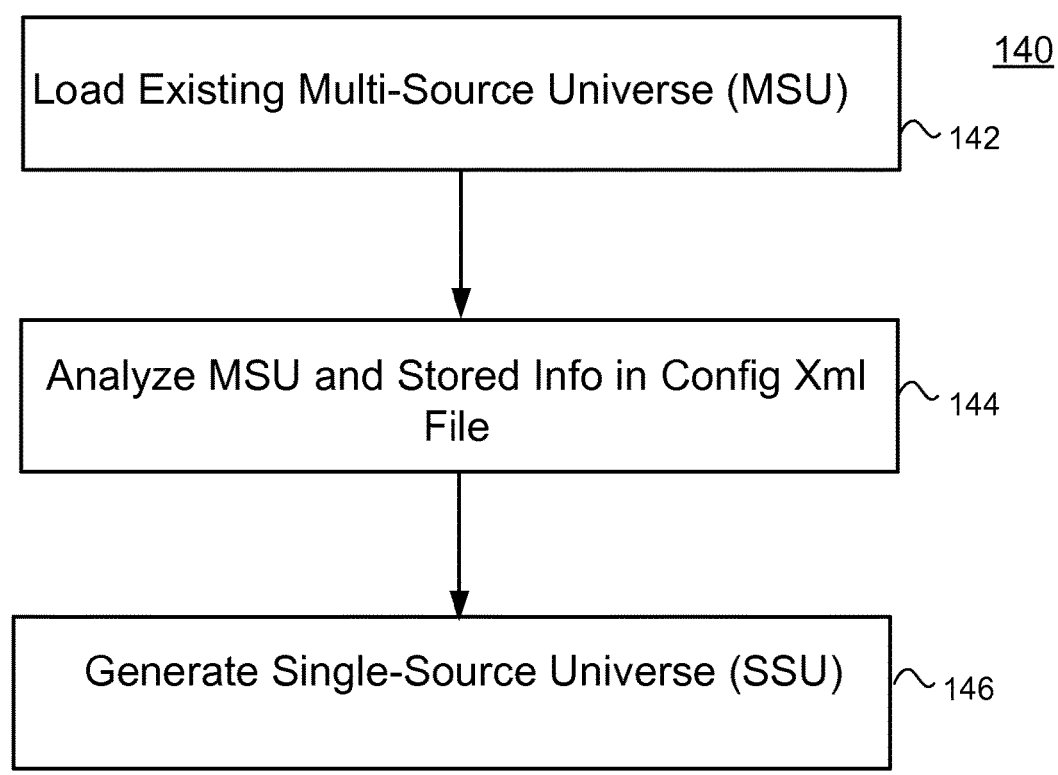
FIG. 1A is a simplified flow diagram of a method according to an embodiment.

Employing embodiments as described herein, a user may perform the steps of the method 140 that is illustrated in connection with the simplified flow diagram of FIG. 1A. Specifically, a first step 142 comprises loading an existing Multi-Source Universe (MSU).

A second step 144 comprises analyzing that MSU and stored info in a configuration file. In certain embodiments that configuration file may take the form of an XML file that is available from a data federator module.

A third step 146 in the simplified process flow comprises generating a single-source universe (SSU).

Figure 1B:
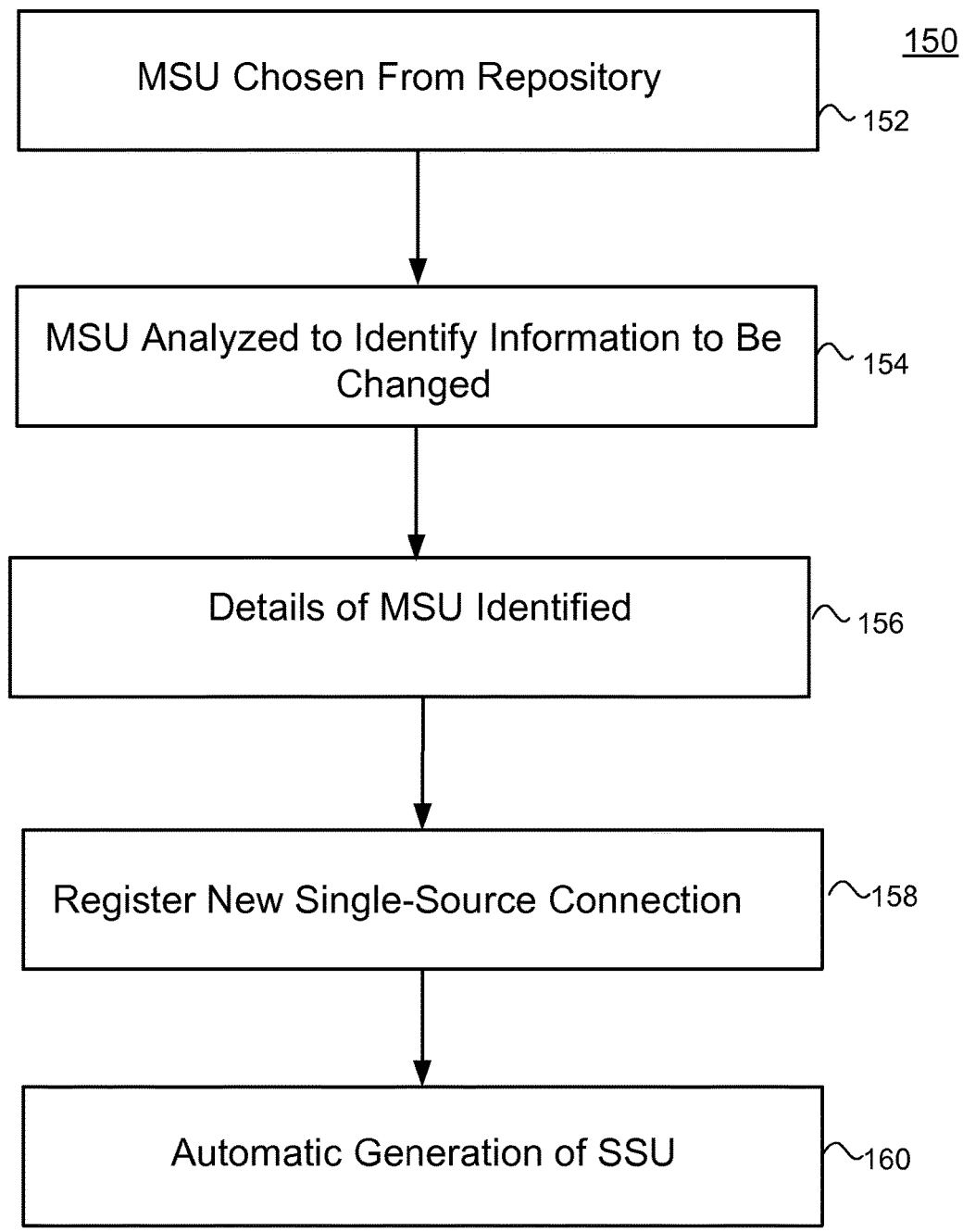
FIG. 1B is a more detailed flow diagram of a method according to an embodiment.

Employing embodiments as described herein, a user may perform the steps of the method 150 that is illustrated in connection with the more detailed flow diagram of FIG. 1B, in order to achieve conversion from a multi- to a single-source database environment.

Specifically, in a first step 152, a user chooses the existing multi-source universe from a data object repository. One example of such a repository is the BusinessObjects Enterprise (BOE) repository available from SAP AG of Walldorf, Germany.

In a second step 154 the selected MSU is analyzed to identify information to be modified in order to convert from a multi-source universe to a single-source universe.

In a third step 156, once the multi-source universe is loaded and scanned through, a universe analysis module may be used to identify one or more details of that universe. Examples of such details may include but are not limited to the following.

Connection: connection characteristic of a database universe provides details regarding establishing a connection with that database.

Tables: this detail represents a physical table that is present in a database.

View: this detail is a view that is created in the database.

Alias Table: an Alias Table is a copy of a table (in point a) already present in the schema.

Derived Table: a Derived Table allows a user to write a native DB query which can yield a result set representing a table.

Joins: Joins represent a join operation between two relevant columns of the database.

Dimensions: a dimension is metadata that identifies and categorizes data of a data object.

Measure: a measure is quantitative data in a data object;

Native Database: a Native Database Function is used in the data objects of the universe objects (Dimension, Measures).

Contexts: context represents affiliated information between a data object and the database universe.

Queries: customers can form a query using universe objects and save the query with universe for sharing with reports.

Parameters: parameters can be set as part of a universe. One example of a parameter is enable Query Stripping.

A fourth step 158 comprises registering a new single-source connection. In particular, connection details in the previous step are fetched. A connection to the repository (e.g. BOE Repository) may be made using an information design tool (IDT).

In certain embodiments a new single-source connection can be registered using Create Connection Application Program Interfaces (APIs) based upon database vendor details and/or driver details identified as part of the previous step. The connection is tested, and upon issuance of a password request, the password is entered and the connection registered in the repository.

Figure 1C:
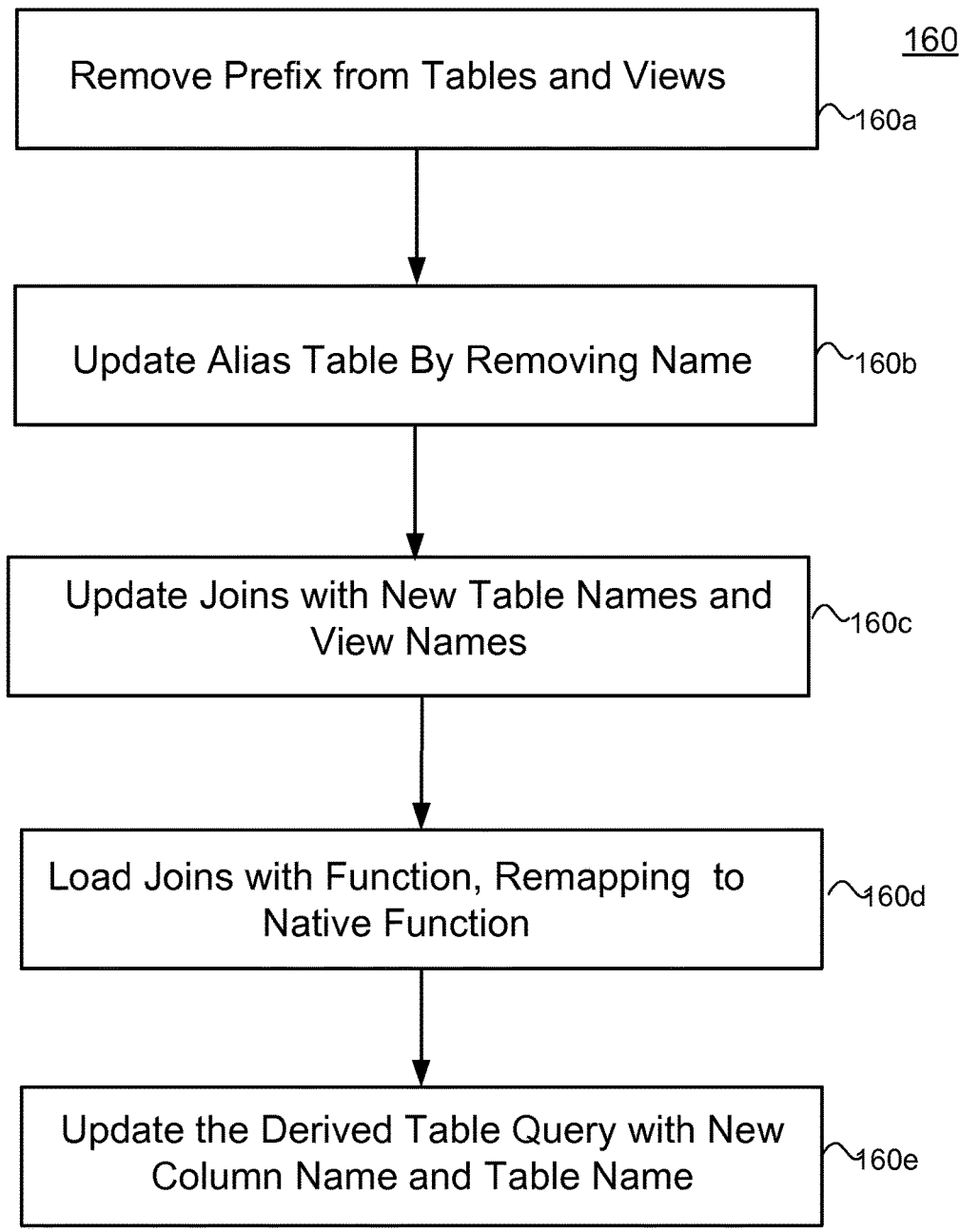
FIG. 1C is a flow diagram illustrating certain sub-steps of the method of FIG. 1B.

A fifth step 160 comprises automatic re-generation of the single-source universe. This is accomplished by running an automatic universe generation module (described below in connection with FIG. 4) which will automatically perform the following sub-steps according to FIG. 1C.

A first sub-step 160a is to remove the prefix from tables and the views with Qualifier, Owner.

For example: T1(TableName)=Qualifier1·Owner1·T1

A second sub-step 160b is to update the Alias table by removing the Qualifier,Owner name. A third sub-step 160c is to update the joins with newly generated table names and View names.

A fourth sub-step 160d is to load all the joins with function, using an Automatic Function Mapping Module to remap a data federator engine function to the corresponding native function.

A fifth sub-step 160e is to update the derived table query with new column name and table name. Joins are updated with new column names and table names. Updated function usage may be performed with an Automatic function mapping module (described in connection with FIG. 3) to update with new function. For calculated column usage, a calculated column is mapped with the appropriate column name, correct functions, and native function corresponding to the query engine function.

Finally, the Data Foundation and the Business Layer may be regenerated using the new object definition compatible with the single-source universe. In certain embodiments this may be done using a Software Development Kit (SDK) of an Information Design Tool (IDT) available from SAP AG of Walldorf, Germany.

Figure 2:
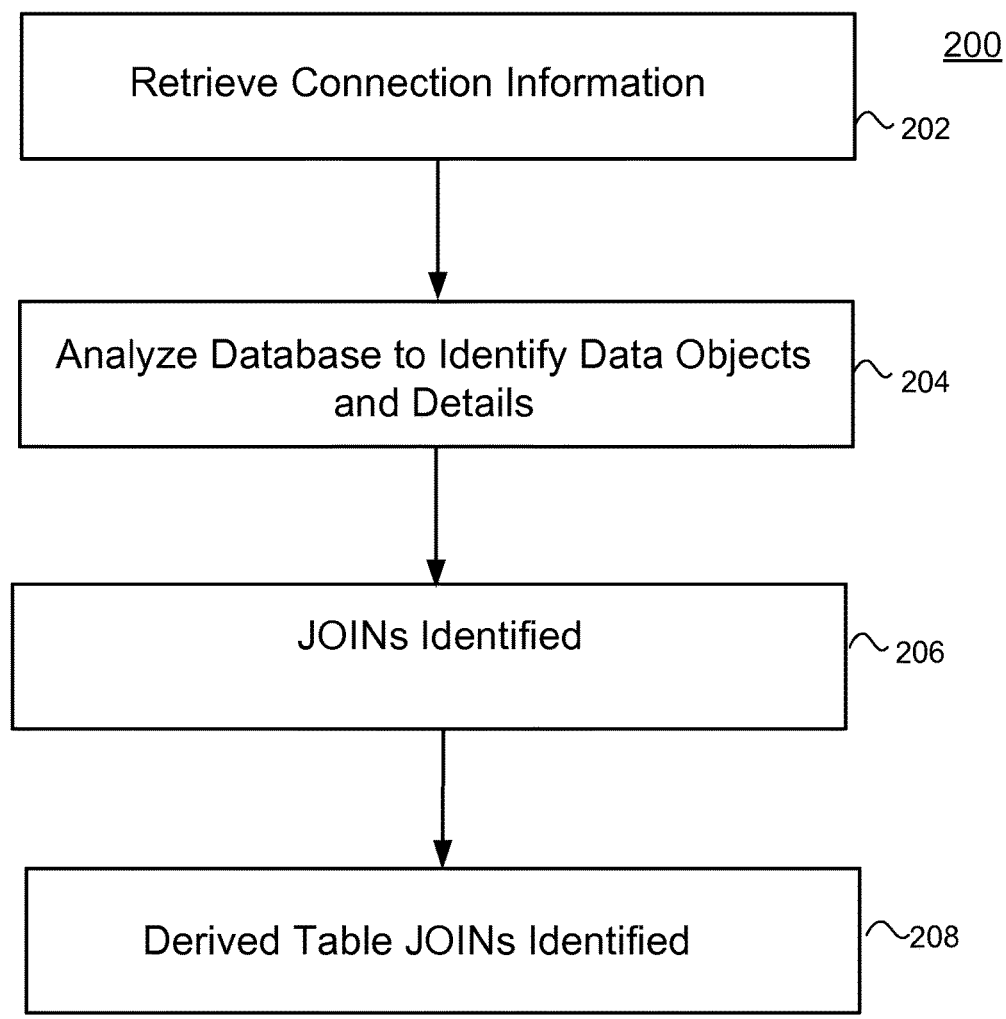

FIGS. 1D1-1D2 show a detailed flow diagram illustrating various aspects of universe generation according to embodiments. In these figures, BLX refers to a file within the business layer. Various aspects of this process are now described in detail below.

In particular, one or more steps of the method described above, may involve the application of one or more algorithms to database data. Certain embodiments of these algorithms are now described below. These algorithms can be expressed and updated in the form of an XML configuration file, and used in a final step of universe generation.

FIG. 2 shows steps of a Universe Analysis and Automatic Conversion algorithm 200. A first step 202 is to retrieve the connection information from the universe analysis. Based upon the connection details, the vendor and version of the database may be accurately identified by analyzing the universe.

Figure 2A:
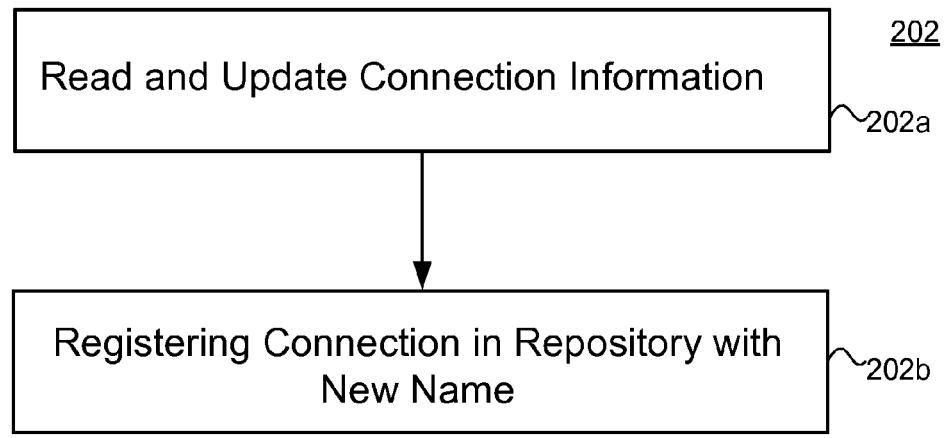

FIG. 2A shows two substeps of this first step. In particular, first sub-step 202a involves reading the connection information, and updating the connection with additional information required for the single source universe. A second substep 202b comprises registering the connection in a repository with a new name.

Figure 2B:
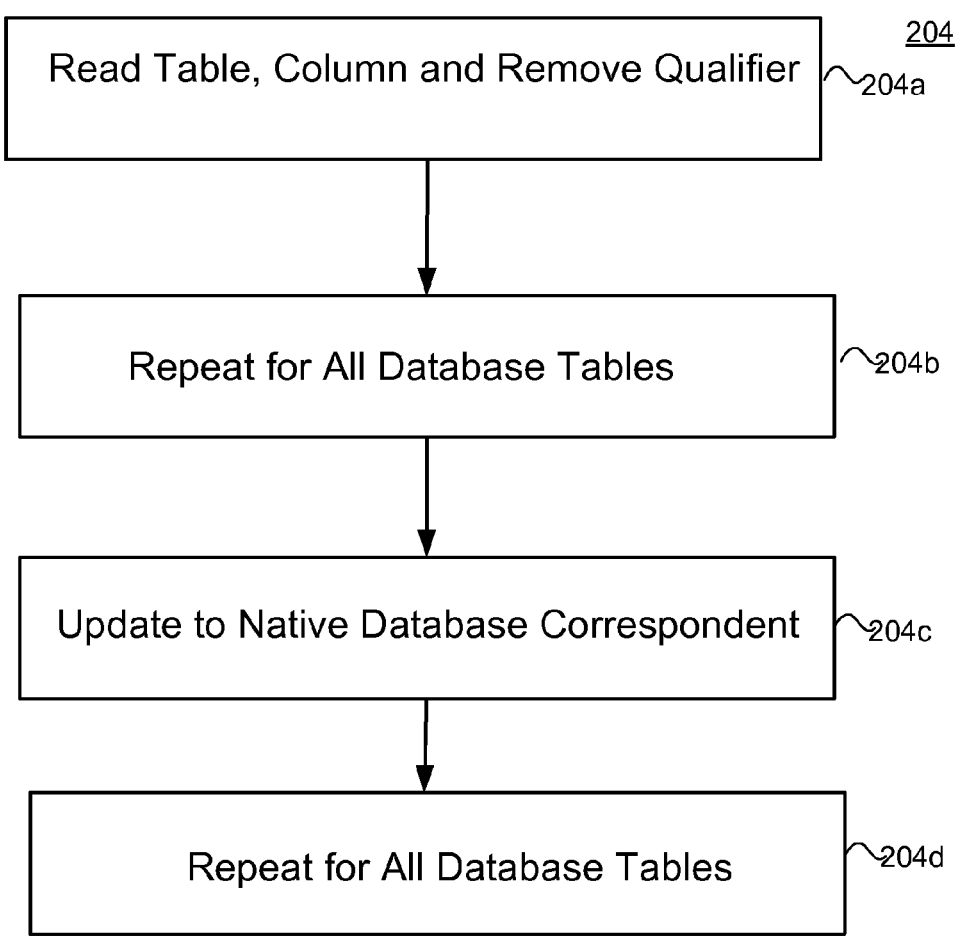

A second step 204 of FIG. 2 is to analyze the universe to identify the database objects (table, view), joins, and database vendor-specific syntax used by objects. This second step is in turn broken down into various sub-steps as described in FIG. 2B.

A first sub-step 204a comprises reading each table and respective column, and modifying the table name, View Name, and Alias Table by removing qualifier, Owner name, and connector name. A second sub-step 204b comprises repeating for all of the database tables available in all of the universes.

In a next sub-step 204c, for each table the columns are scanned and the data federator query engine function is updated to a native database datatype correspondent. This engine may be available as part of an adaptive server in the SAP Business Objects of corresponding datatype. In sub-step 204d this may be repeated with all the tables available in the universe.

Figure 2C:
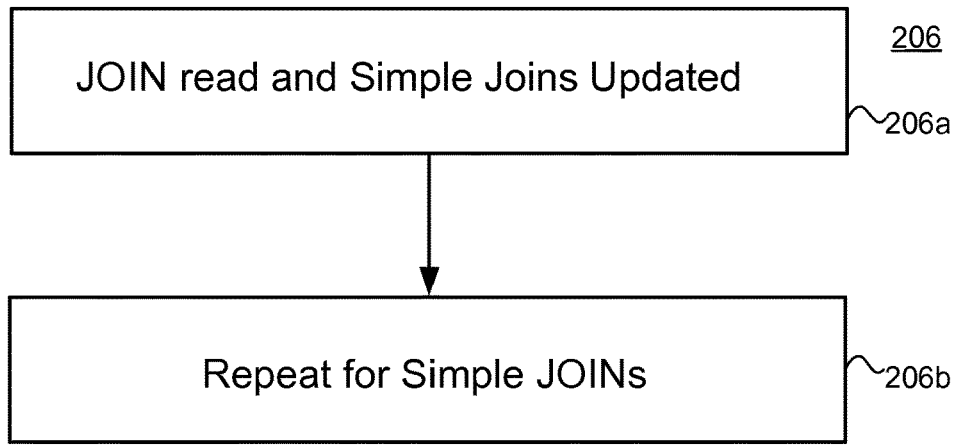

In a third step 206 of FIG. 2, JOINs having database vendor-specific syntax are identified, by analyzing the universe. FIG. 2C shows a number of the sub-steps involved.

In a first sub-step 206a, each join may be read, and simple joins updated with the updated table name, column name achieved in the previous steps 202 and 204. In a second sub-step 206b, this may be repeated for all of the simple joins.

Figure 2D:
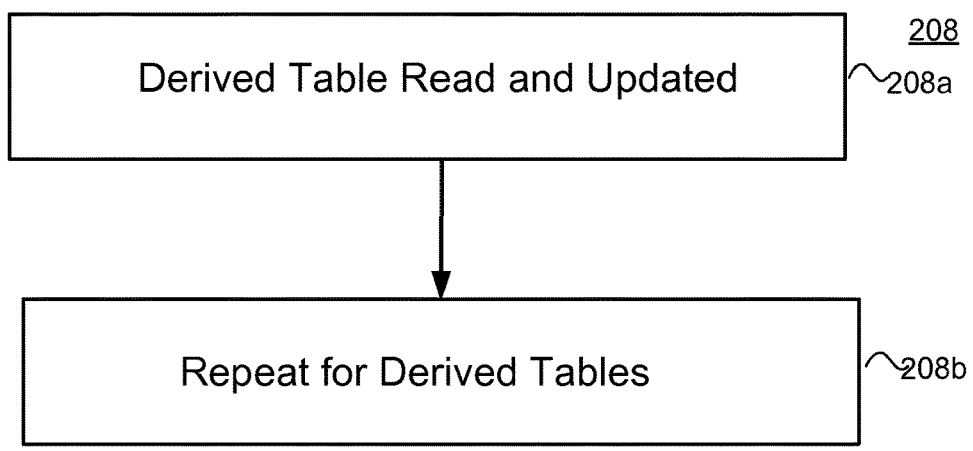

In a fourth step 208 of FIG. 2, the universe is analyzed to identify the derived table JOINs. Two sub-steps are shown in FIG. 2D.

In a first sub-step 208a, the derived table definition is read and the table, column name, and join information updated using the same steps previously mentioned in connection with step 204 and 206. In a second sub-step 208b, this process is then repeated for the derived tables identified in the universe with simple joins.

A process flow 300 for an automatic function mapping algorithm is now shown and described in connection with FIG. 3.

In a first step 302 connection information from the universe analysis is retrieved. Based on the connection details, the database vendor and version are identified by analyzing the universe. Sub-steps of the step 302 are now described in connection with FIG. 3A.

In a first sub-step 302a, using the database information fetched from the connection information, an appropriate function translation mapping file applicable to this database connection is selected. The configuration file may available in the data federator connector module applicable to this database connection.

In a second sub-step 302b, the universe is analyzed using the Universe Analysis and Automatic Universe Conversion Algorithm described previously in connection with FIG. 2. The objects (Dimension, Measures) therein are identified using Native DB functions in their definition.

In a third sub-step 302c, the universe is analyzed using the previous Universe Analysis and Universe Conversion algorithm of FIG. 2. The JOINs having function as part of other JOINs are identified.

In a fourth sub-step 302d, the derived table is analyzed to identify any function usage. In a fifth sub-step 302e, the previous step is repeated with the objects, tables, and joins available in the universe.

Figure 3:
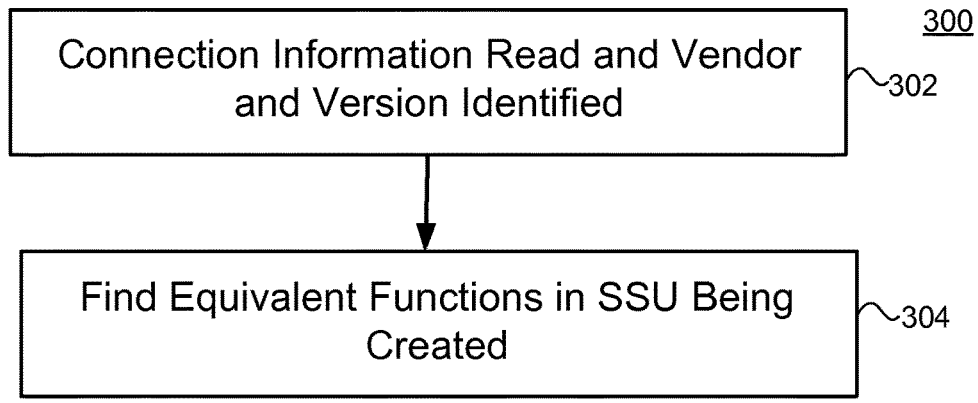
FIGS. 3-3B show steps of function mapping according to an embodiment.
Figure 3A:
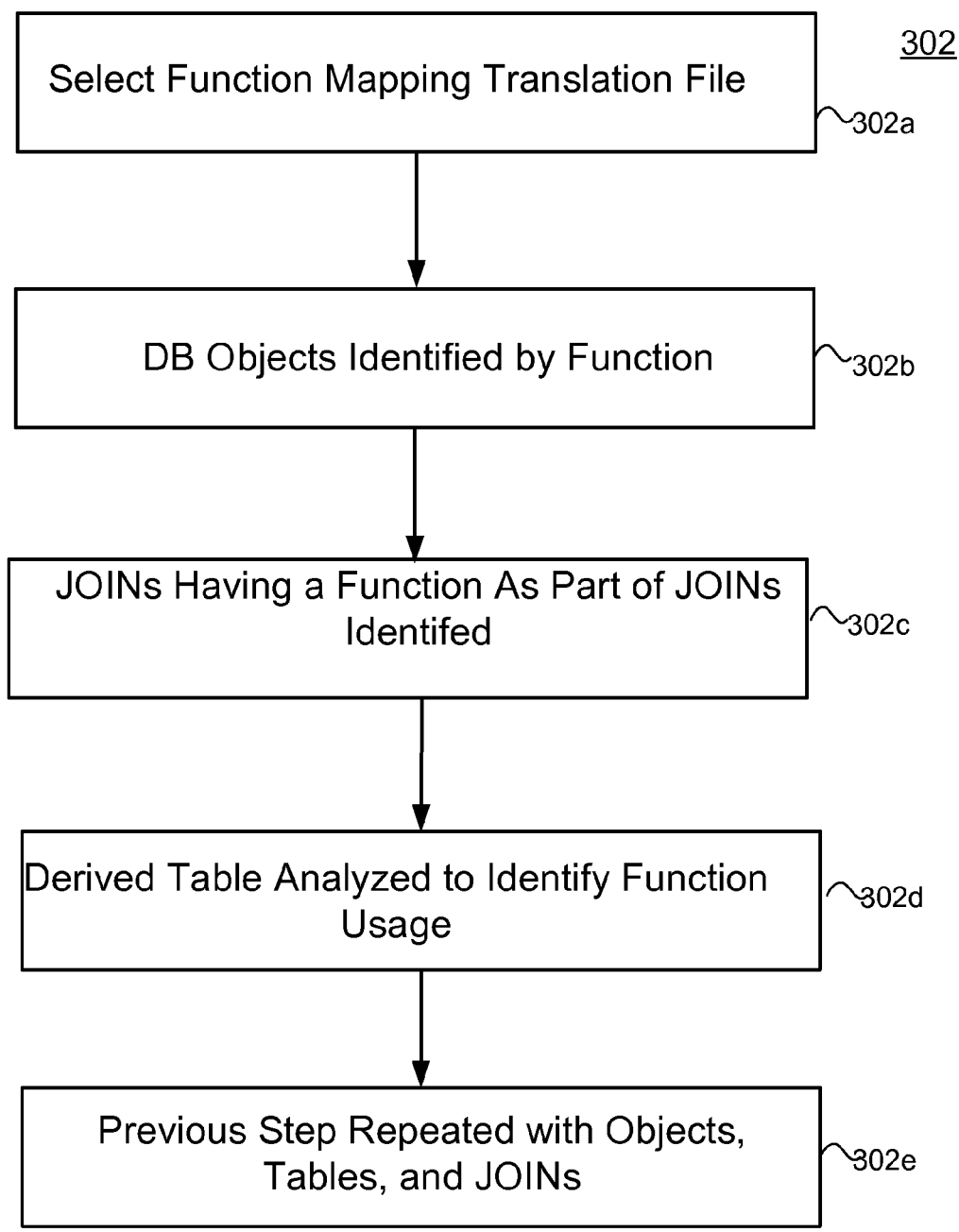
Figure 3B:
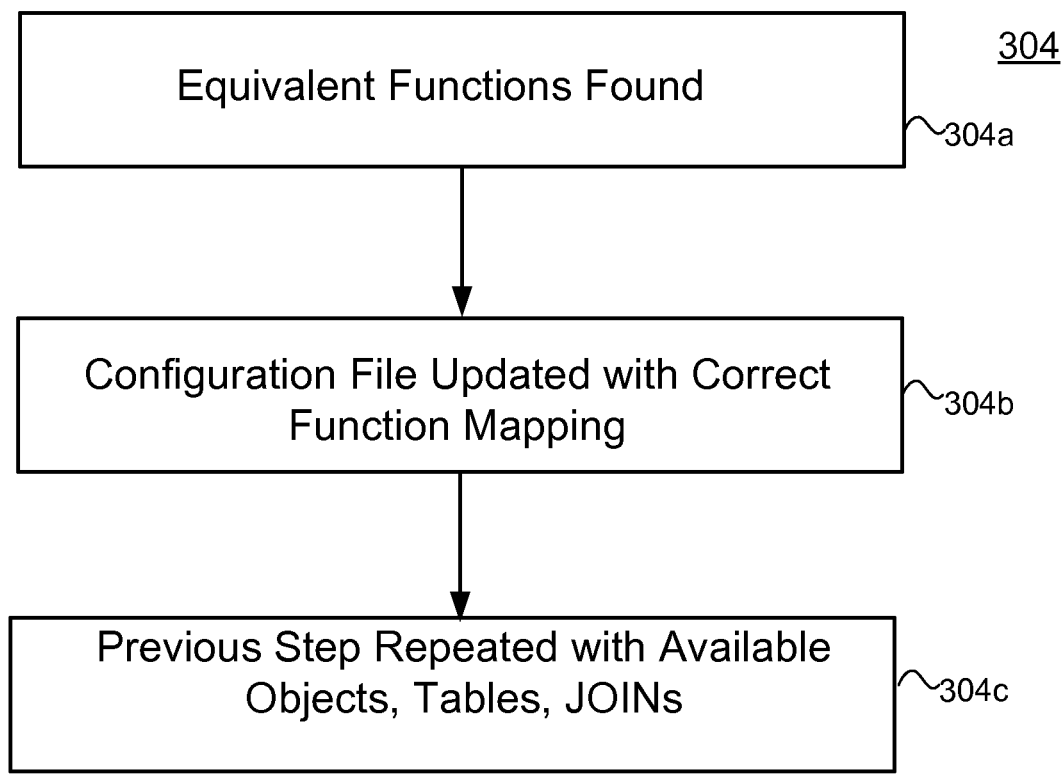

A second step 304 is shown in FIG. 3. This step comprises finding corresponding functions in the new universe that is being created. Sub-steps of this step are now described in FIG. 3B.

In a first sub-step 304a, the functions identified in the previous step are reviewed, and corresponding functions are found. This may be done from the function translation file and map with appropriate function having the correct parameters being used in the existing function.

In a second sub-step 304b, the configuration file which is being used at the time of universe conversion is updated with the correct function mapping.

In a third sub-step 304c, the above step is repeated with the objects, tables, and joins available in that universe.

Figure 4:
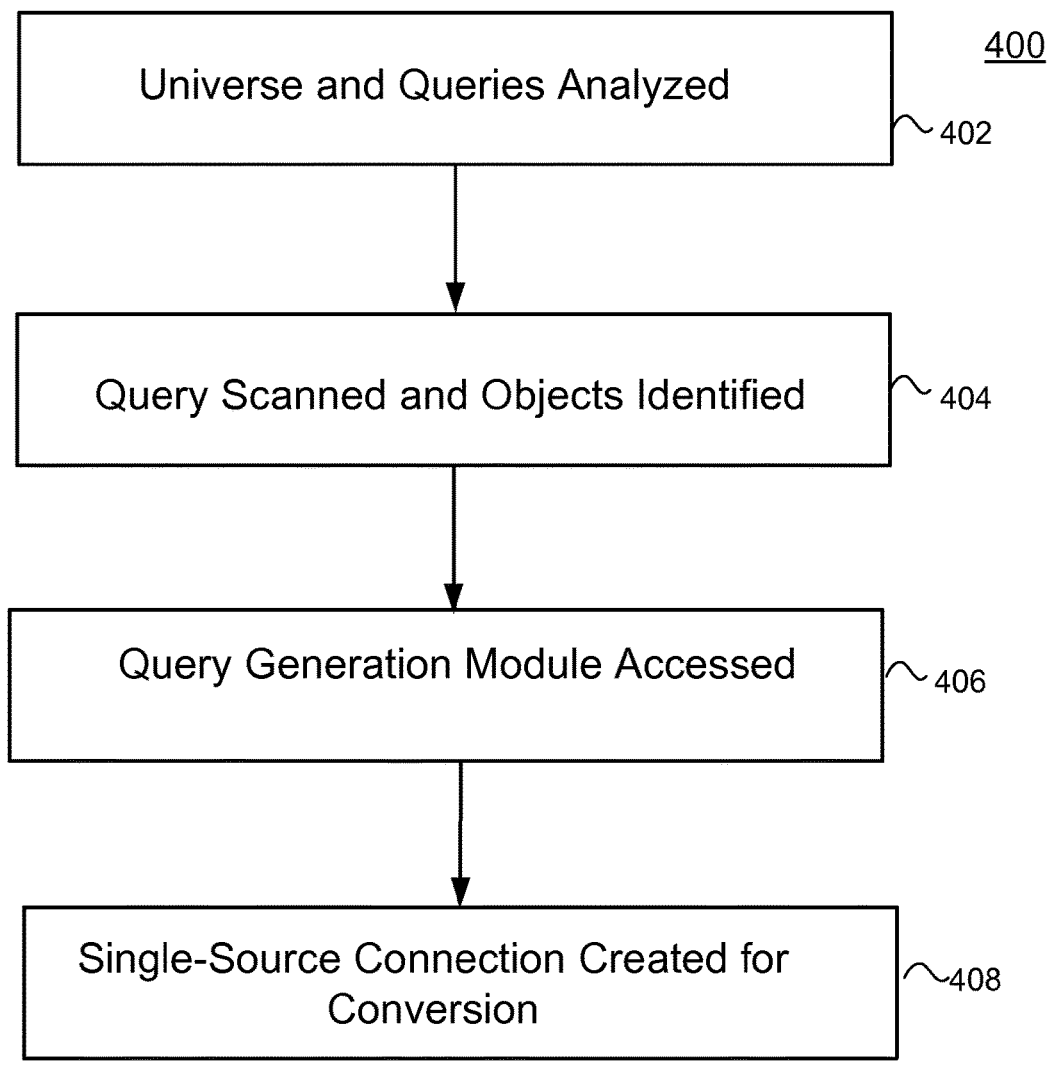
FIG. 4 show steps of query generation according to an embodiment.

A query generation module utilizing a query generation algorithm is now described in connection with FIG. 4. In a first step 402, the universe is analyzed, and also queries which are part of that universe.

In a second step 404, the query is scanned and objects used in the query are identified. In a third step 406, the SAP Java Software Development Kit (SDK) Query generation module which is part of the information designer tool, is used.

A fourth step 408 comprises creating a single-source connection for conversion purposes. The SDK of the Query generation module is referenced using the objects used in the select selection and also the appropriate table name. The appropriate join definition and request for generation of the query are selected.

Universe Conversion Algorithm

Figure 5:
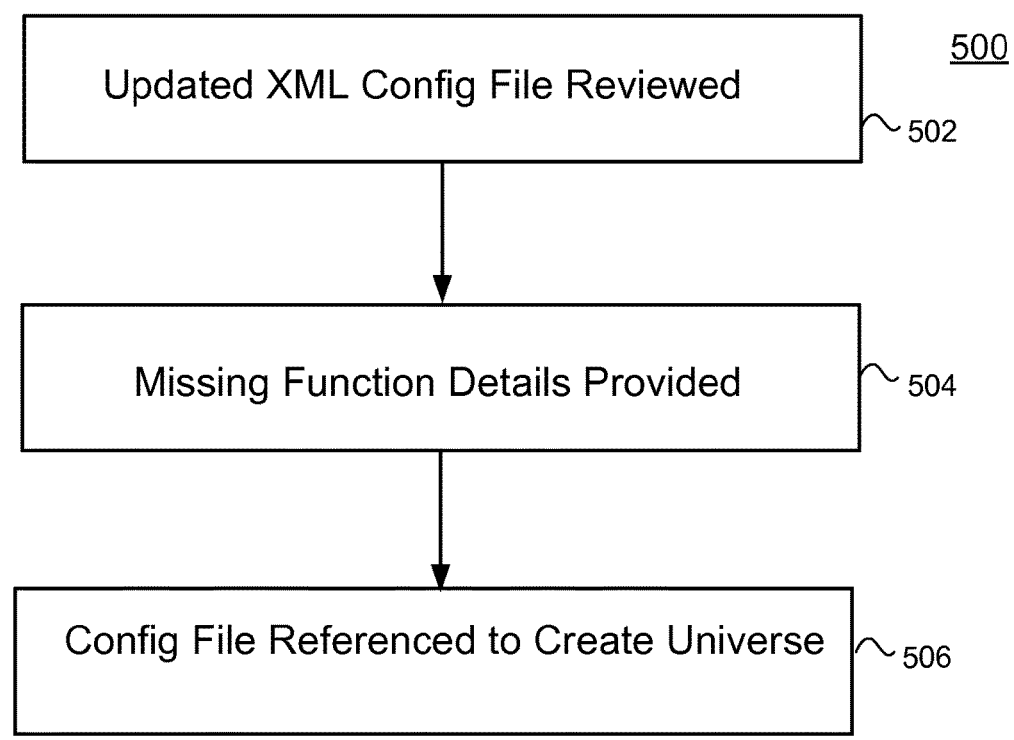

An embodiment of an algorithm for universe conversion 500 is now described in connection with the process flow of FIG. 5. In a first step 502, the XML configuration file updated in the above steps is previewed to confirm that the correct details are being used to generate the single-source universe.

In a second step 504, the universe conversion module provides missing function details not available in function mapping. These missing function details need to be handled differently.

In a third step 506, the configuration file and the universe conversion module are used to make a copy of the source universe and use the configuration to start converting the universe. Details regarding this step are now discussed in connection with FIGS. 5A1-5A2.

Specifically, a first sub-step 506a a comprises performing the steps of the Universe Analysis Algorithm (FIG. 2) and the Automatic Universe Conversion Algorithm (FIG. 5) using details available in the configuration file used for Universe Conversion.

A second sub-step 506b comprises performing function mapping steps as mentioned in the automatic function mapping module discussed in connection with FIG. 3 above.

A third sub-step 506c comprises performing the query generation using steps as described in the Query Generation module mentioned above in connection with FIG. 5.

A fourth sub-step 506d comprises generating the queries. A fifth sub-step 506e comprises generating the data foundation using the Information Design Tool (IDT) data foundation create Software Development Kit (SDK), for example as may be available from SAP AG.

A sixth sub-step 506f comprises updating the context that was part of the original universe, which has been recreated as part of universe creation.

A sixth sub-step 506g comprises generating the Business Layer using the IDT Business Layer create SDK available from SAP AG.

A seventh sub-step 506h comprises exporting the universe.

A eighth sub-step 506i comprises creating a copy of documents created on the original universe, and regenerating queries based on the new universe. The document is refreshed to obtain data and saved to preserve the query and the data.

One particular embodiment is now illustrated in conjunction with a specific example. In particular, the Business Objects Enterprise (BOE) is a database platform available from SAP AG of Walldorf, Germany. Version 4.0 SP4 or above of the SAP BOE database platform, may afford a user the ability to utilize the SAP datafederator query engine for query creation. A user may also avail themselves of the Information Design Tool (IDT) data foundation create Software Development Kit (SDK), and/or the IDT Business Layer create SDK.

Various embodiments can provide one or more of the following benefits. One is the ability to enhance performance in handling data.

That is, reasons for a use case justifying resort to a multi-source database universe may eventually decline (for example as merger/acquisition targets become fully assimilated into the parent). Then, the benefits of enhanced performance and reduced consumption of processing resources offered by a single-source universe may outweigh the need for a multi-source universe. In such cases, embodiments may address a need to convert data from a multi-source environment to a single-source environment.

Figure 6:
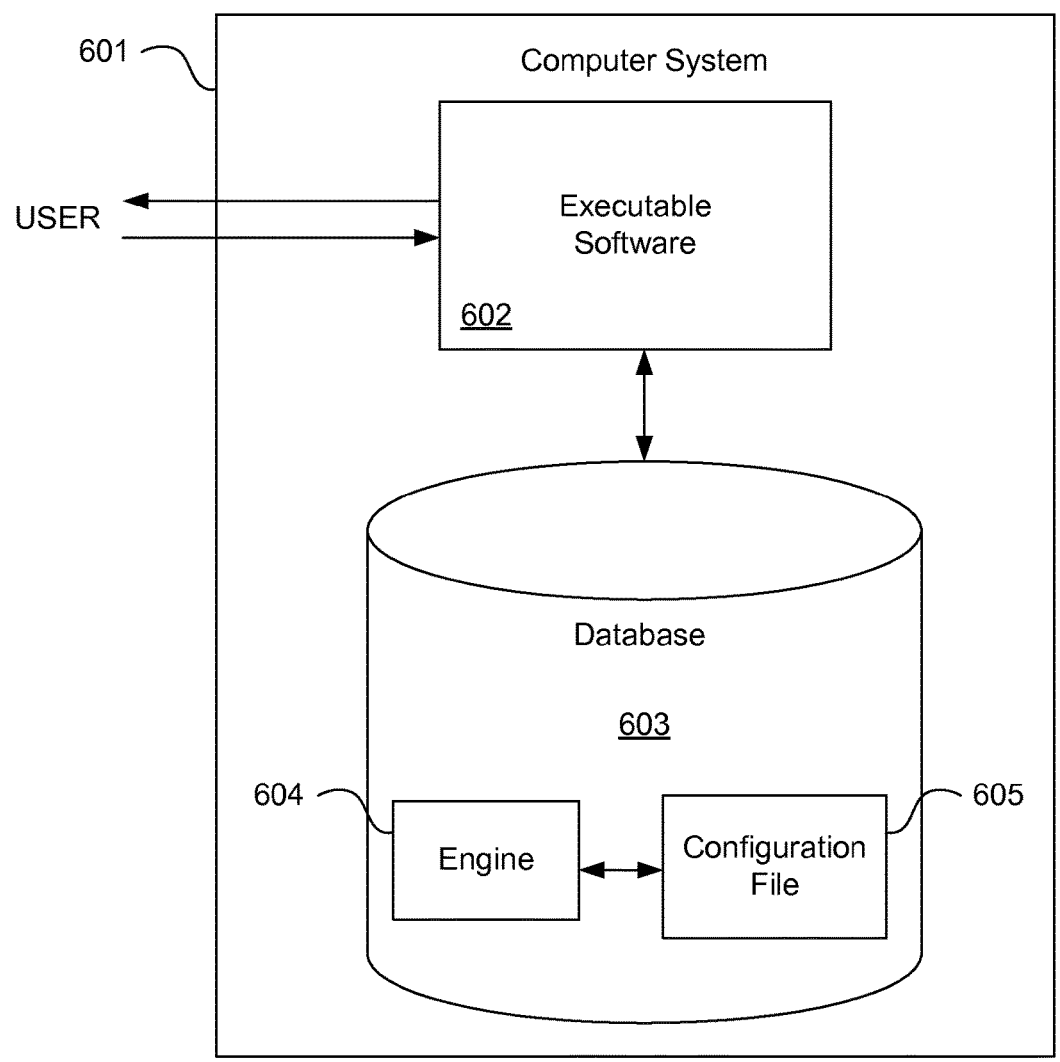
FIG. 6 illustrates hardware of a special purpose computing machine configured to perform universe conversion according to an embodiment.

FIG. 6 illustrates hardware of a special purpose computing machine configured to convert data objects from a multi-source database environment to a single-source database environment according to an embodiment. In particular, computer system 601 comprises a processor 602 that is in electronic communication with a non-transitory computer-readable storage medium 603. This computer-readable storage medium has stored thereon code 605 corresponding to a configuration file. Code 604 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
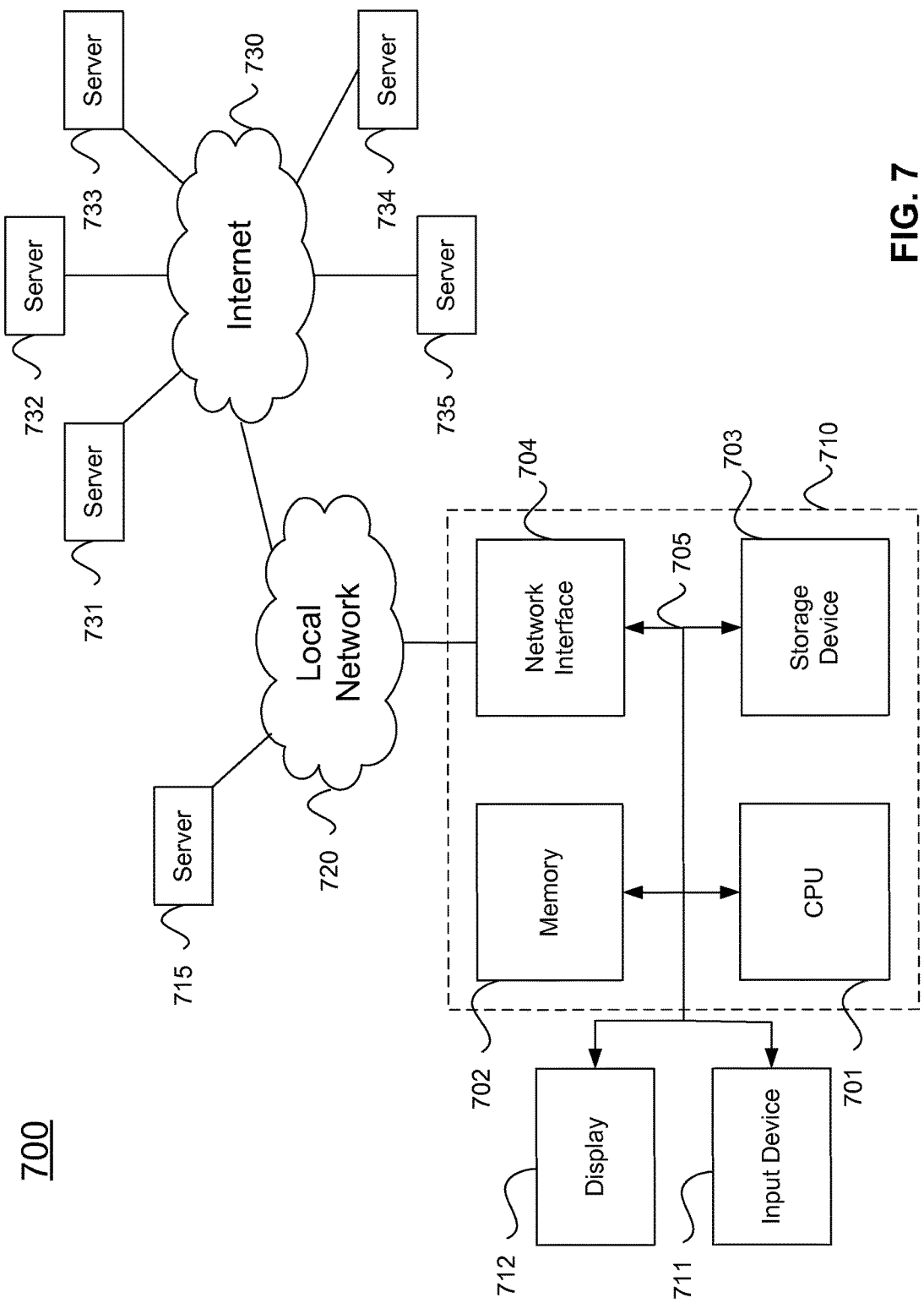
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 804 coupled with bus 805. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising providing a processor configured to cause:
   an engine to receive an existing multi-source universe database comprising a plurality of details;
   the engine to analyze the existing multi-source universe database referencing a configuration file in order to identify a detail to be changed including vendor and version information, wherein the detail comprises a vendor-specific syntax of a join operation;
   the engine to register a new single-source connection with a repository; and
   the engine to reference the configuration file to create a new single-source universe database including the single-source connection and the changed detail by removing a qualifier and an alias table name, and by generating a business layer compatible with the single-source universe database and further comprising a derived table used to generate a native query of the single-source universe database including the join operation updated with a new column name and a new table name.

2. A method as in claim 1 wherein:
   the existing multi-source universe database is analyzed to identify a data object by a database function; and
   the new single-source universe database comprises a corresponding native function.

3. A method as in claim 2 wherein creating the new single-source universe database further comprises generating the business layer including a new object definition compatible with the new single-source universe database.

4. A method as in claim 1 wherein the configuration file is from a data federator.

5. A method as in claim 1 wherein the configuration file comprises an XML file.

6. A method as in claim 1 wherein creating the new single-source universe database further comprises generating the data foundation from a software development kit available from a vendor of the single-source universe database.

7. A non-transitory computer readable storage medium embodying a computer program for performing a method, said method comprising providing a processor configured to cause:
   an engine to receive an existing multi-source universe database comprising a plurality of details;
   the engine to analyze the existing multi-source universe database referencing a configuration file in order to identify a detail to be changed including vendor and version information, the existing multi-source universe analyzed to identify a data object by a database function, wherein the detail comprises a vendor-specific syntax of a join operation;
   the engine to register a new single-source connection with a repository;
   the engine to reference the configuration file to create a new single-source universe database including the single-source connection and the changed detail by removing a qualifier and an alias table name, and by generating a business layer compatible with the single-source universe database and further comprising a derived table used to generate a native query of the new single-source universe database including the join operation updated with a new column name and a new table name, the new single-source universe database comprising a native function corresponding to the database function.

8. A non-transitory computer readable storage medium as in claim 7 wherein creating the new single-source universe database further comprises generating the business layer including a new object definition compatible with the new single-source universe database.

9. A non-transitory computer readable storage medium as in claim 7 wherein creating the new single-source universe database further comprises generating the data foundation from a software development kit available from a vendor of the single-source universe database.

10. A non-transitory computer readable storage medium as in claim 7 wherein the configuration file is from a data federator.

11. A non-transitory computer readable storage medium as in claim 7 wherein the configuration file comprises an XML file.

12. A computer system comprising:
    one or more processors;
    a software program, executable on said computer system, the software program configured to:
    cause an engine to receive an existing multi-source universe database comprising a plurality of details;
    cause the engine to analyze the existing multi-source universe database referencing a configuration file from a data federator in order to identify a detail to be changed including vendor and version information, the existing multi-source universe analyzed to identify a data object by a database function, wherein the detail comprises a vendor-specific syntax of a join operation;

cause the engine to register a new single-source connection with a repository;

cause the engine to reference the configuration file to create a new single-source universe database including the single-source connection and the changed detail by removing a qualifier and an alias table name, and by generating a business layer compatible with the new single-source universe database and further comprising a derived table used to generate a native query of the new single-source universe database including the join operation updated with a new column name and a new table name, the new single-source universe database comprising a native function corresponding to the database function.

13. A computer system as in claim 11 wherein creating the new single-source universe database further comprises generating the business layer including a new object definition compatible with the new single-source universe database.

14. A computer system as in claim 11 wherein creating the new single-source universe database further comprises generating the data foundation from a software development kit available from a vendor of the new single-source universe database.

* * * * *